C. C. McINTOSH.
FRUIT SIZER.
APPLICATION FILED OCT. 4, 1909.
1,052,499.
Patented Feb. 11, 1913.
3 SHEETS—SHEET 1.
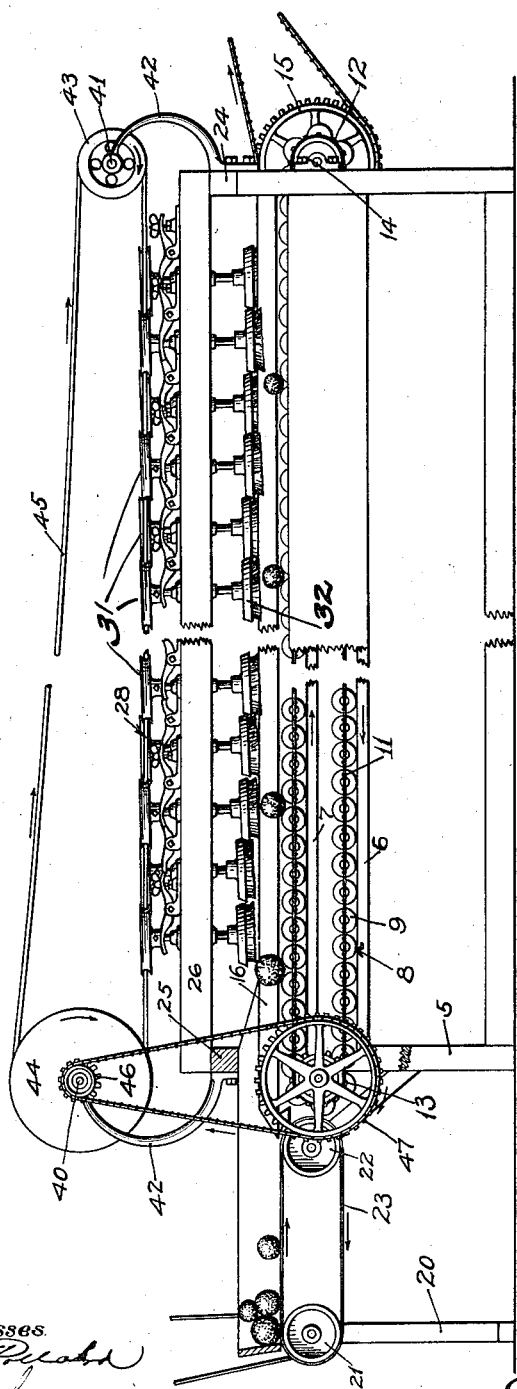
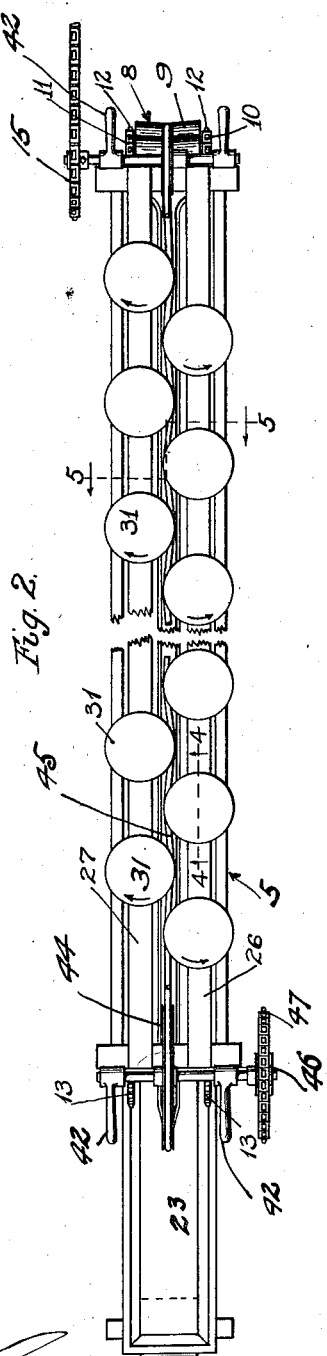
Witnesses
Chas. C. McIntosh, Inventor
Attorneys.

C. C. McINTOSH.
FRUIT SIZER.
APPLICATION FILED OCT. 4, 1909.
1,052,499.
Patented Feb. 11, 1913.
3 SHEETS—SHEET 2.
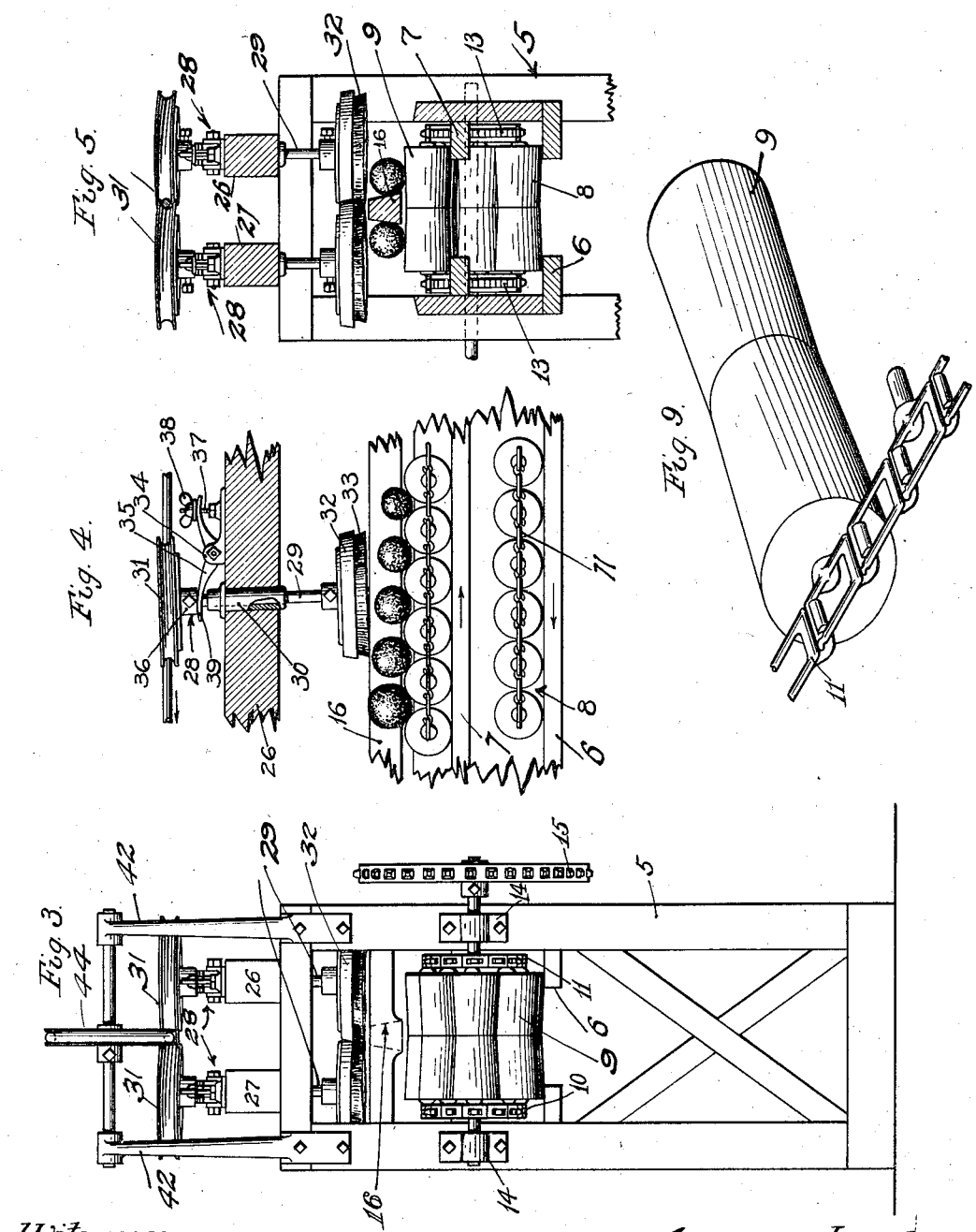

C. C. McINTOSH.
FRUIT SIZER.
APPLICATION FILED OCT. 4, 1909.
1,052,499.
Patented Feb. 11, 1913.
3 SHEETS—SHEET 3.
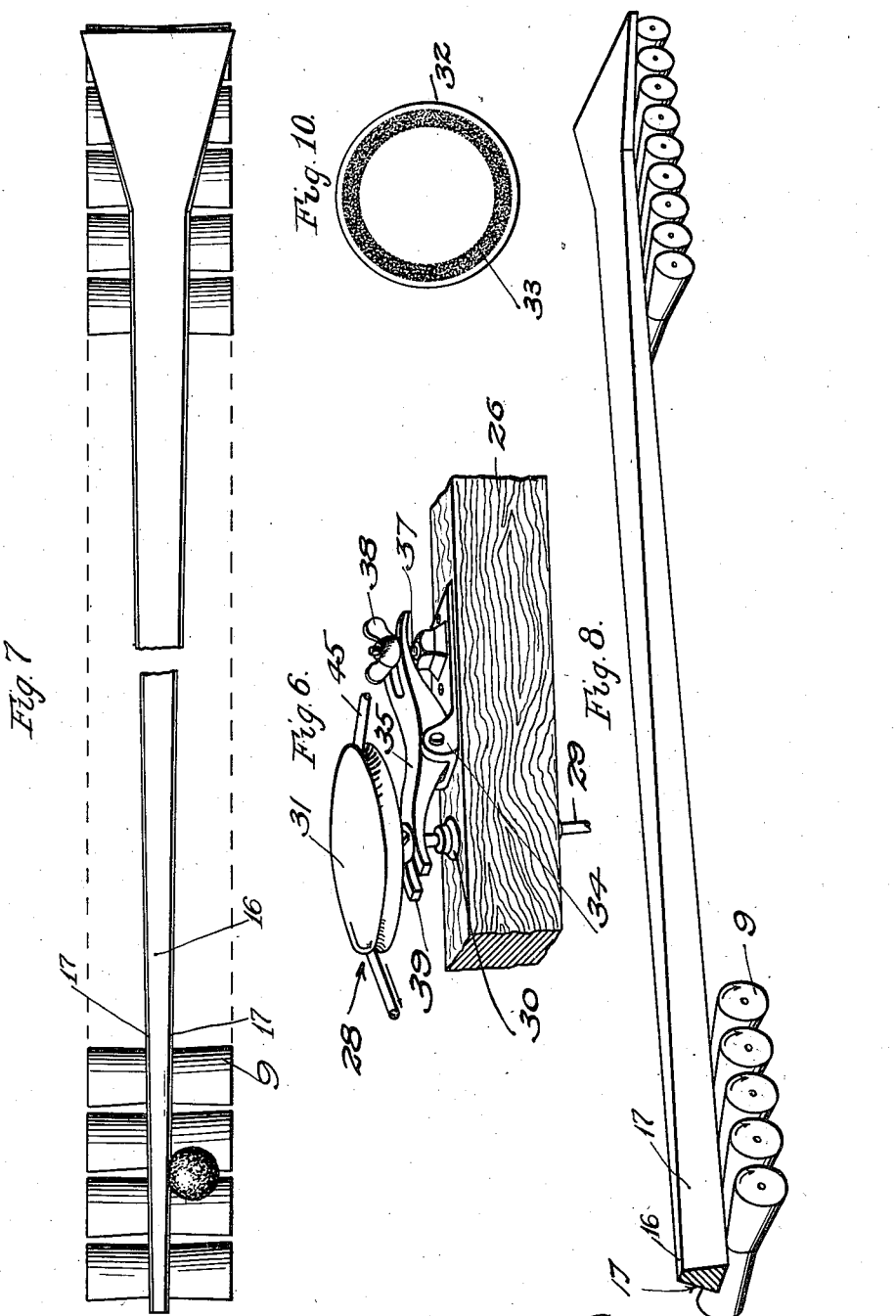
Witnesses.
Inventor:
Attorneys.

UNITED STATES PATENT OFFICE.

CHARLES C. McINTOSH, OF LOS ANGELES, CALIFORNIA, ASSIGNOR, BY MESNE ASSIGNMENTS, TO FRED STEBLER, OF RIVERSIDE, CALIFORNIA.

FRUIT-SIZER.

1,052,499.

Specification of Letters Patent.   Patented Feb. 11, 1913.

Application filed October 4, 1909.   Serial No. 520,952.

*To all whom it may concern:*

Be it known that I, CHARLES C. MCINTOSH, a citizen of the United States, residing at Los Angeles, in the county of Los Angeles and State of California, have invented a new and useful Fruit-Sizer, of which the following is a specification.

This invention relates more specifically to an apparatus for sizing citrus fruits, and a main object is to provide an apparatus which will efficiently handle all classes of fruit, whether that fruit be spherical or oblong in configuration.

Another and important object is to provide an apparatus in which the fruit to be sized is continuously rotated during its conveyance through the machine until its final ejection therefrom, thereby greatly contributing to the accuracy of the sized fruit.

A further object is to provide an apparatus in which the fruit to be sized is segregated during its passage along the conveyer, thereby rendering impossible the ejectment of more than one fruit at a sizing operation of any one particular ejector mechanism.

A further object is to provide an apparatus in which the fruit ejector mechanism may be instantly adjusted to accommodate the various sizes of fruit that are being acted upon.

In the accomplishment of the above objects I preferably employ an apparatus which consists of a horizontally disposed traveling fruit conveyer, composed of a plurality of tapered spools or rolls and a plurality of rotatable vertically adjustable sizing disks arranged thereabove and spaced apart along the conveyer, and adapted to eject the fruit from the conveyer into receptacles or bins arranged along the side of the conveyer, the height from the upper face of the conveyer to the under face of the sizing disks being accurately gaged by an adjusting means operatively connected to the sizing mechanisms.

In the accompanying drawings forming a part of this specification Figure 1 is a side elevation of my complete apparatus. Fig. 2 is a plan view of the same. Fig. 3 is an end elevation. Fig. 4 is an enlarged detail section taken on line 4—4 of Fig. 2. Fig. 5 is an enlarged detail cross section taken on line 5—5 of Fig. 2. Fig. 6 is a perspective view of the sizing disks adjusting mechanism. Fig. 7 is a diagrammatic plan view of the fruit conveyer. Fig. 8 is a diagrammatic perspective view of the fruit conveyer. Fig. 9 is a perspective detail of one of the spools forming a part of the fruit conveyer. Fig. 10 is a bottom plan view of one of the sizing disks.

The apparatus as illustrated and described is especially adapted for the sizing of citrus fruits, but it may be constructed with but slight and immaterial changes so that it will effectually size other fruit or articles of similar configuration with equal facility.

As illustrated in the accompanying drawings a frame 5 of suitable configuration is provided which supports a pair of centrally disposed longitudinal conveyer tables 6, 7, each table being composed of a pair of side rails over which travels the endless conveyer 8, preferably formed of a plurality of spools or rolls 9, each spool tapering from its ends inwardly toward the center and being rotatively connected to sprocket chains 10, 11, as clearly illustrated in Fig. 9 of the drawings. Sprocket chains 10, 11, pass over sprocket wheels 12, 13, journaled in bearings 14 secured to the ends of frame 5, and a power sprocket wheel 15 driven from a source of power (not shown) continuously operates the conveyer in the direction indicated by the arrows in Fig. 1 of the drawings.

The above described conveyer mechanism constitutes one of the most important and salient features of my invention, as the spools or rolls 9 traveling over the rails that form the conveyer bed are continuously rotated in the direction indicated in the various views of the drawings, thus imparting a rotary motion to the fruit and insuring accuracy in sizing.

In the drawings I have illustrated the apparatus as a double apparatus, that is the sizing function will take place simultaneously on both sides of the machine, but the apparatus may be constructed singly for small packing houses or for individual growers. The spools or rolls 9 are preferably formed from wood or similar material, and are tapered from their ends inwardly as shown in Fig. 8 of the drawings, so that when the fruit is being conveyed from one end of the apparatus to the other it will have a tendency to hug a centrally disposed guide rail 16, the fruit resting in the concavity formed by adjacent spools. The faces 17 of this guide rail are inclined inwardly from the vertical to strengthen the rail as well as to present as little surface as possible to the fruit as it is rapidly conveyed through the apparatus. The guide rail at the feed end of the apparatus is approximately about one-half of an inch in width widening toward the opposite end as clearly shown in Figs. 7 and 8 of the drawings and terminating at the extreme end of the conveyer into its widest part which is approximately the width of the tapered spools. In sizing fruit the ejector mechanisms, (which will be more particularly described hereinafter) are arranged so as to discharge the largest fruit adjacent the feed end of the conveyer, the smaller fruit which is unfit for packing or undersized, passing clear through the machine, thus it will be apparent that by increasing the width of rail 16 at the discharge end of the conveyer that the undesirable fruit will be shunted into bins or receptacles (not shown).

At the feed end of the machine I have provided a conveyer feeding mechanism which preferably consists of a suitable frame 20 having mounted thereon an endless conveyer which consists of broad faced pulleys 21, 22, over which passes a conveyer belt 23, suitably disposed side and end rails confining the fruit to the belt 23. By means of this conveyer the fruit is rotated so that when it is delivered to the main conveyer the fruit will be deposited thereon on one of its shortest diameters, the continuous rotation of the fruit on the main conveyer before its final ejectment therefrom further tending to turn it to its shortest diameter, thus insuring an accuracy in sizing unattainable in ordinary belt conveyers.

By forming the main conveyer of a plurality of spools or rolls it will be observed that the conveyed fruit will be segregated and all danger of an undersized fruit being carried off the conveyer at an ejection of a larger fruit will be obviated, the fruit being maintained in an absolutely separated condition at all stages of its movement through the apparatus.

The fruit ejector mechanism is located directly above the conveyer mechanism and preferably consists of a plurality of mechanisms arranged above the conveyer at graduated heights therefrom and spaced apart from one end to the other. As each ejector mechanism is exactly the same in configuration and operates on the same principle, and also for brevity of description I will describe only one. Secured to end cross bars 24, 25, of frame 5 are two longitudinally extending bars 26, 27, in which are mounted a plurality of ejector mechanisms 28. Each mechanism preferably consists of a vertically disposed shaft 29, which is slidingly mounted in a bushing 30 rigidly secured in one of the longitudinally extending bars 26, 27. The upper end of shaft 29 is provided with a sheave 31 detachably secured thereto, and the lower end carries an ejector disk 32 also detachably secured thereto. This ejector disk is preferably provided on its under face adjacent its periphery with two circular rows of flexible bristles 33 that are brought into intimate contact with the fruit on the conveyer when that fruit is of a slightly greater diameter than the height from the upper face of the conveyer to the under face of the ejector disk to eject the same from the conveyer to the receiving bins (not shown). The ejector disks are preferably mounted on the rails 26, 27, so that they are slightly inclined from the vertical, the purpose being to prevent the fruit from accidentally clogging, should the double rows of bristles fail to remove it, this contingency being highly improbable as the slightest contact of the bristles with the fruit will remove them from the conveyer. If by an unforeseen circumstance the fruit should accidentally pass by the bristles of one of the sizing mechanisms, the absence of any bristles in the center of the disks would permit the free and unrestricted passage of the fruit along the conveyer.

On the upper face of the rails 26, 27, and adjacent each of the ejector mechanisms, I have provided an adjusting mechanism which preferably consists of a bearing block 34 in which is pivotally mounted at the center thereof an adjusting arm 35 bifurcated on either end thereof, one end engaging the shaft 29 and bearing against a bearing 36 formed on the under face of sheave 31, the other end of the arm engaging a threaded bolt 37 secured to bearing block 34, a winged nut 38 providing a means whereby the end 39 of arm 35 may be raised or depressed. By means of the above described mechanism the disk 32 may be accurately adjusted with respect to its height from the conveyer.

The sheaves 31 mounted on the upper ends of shafts 29 journaled in the two bars 26, 27, are arranged in parallel longitudinal lines and also in staggered relation to each other, the radius of each pulley being such as to project their peripheries beyond the center of the apparatus as clearly shown in Fig. 2 of the drawings. Mounted on shafts 40, 41, and rotatively mounted in bearing 42 at each end of the apparatus are sheaves 43, 44, rotatively connected by a rope drive 45, the rope passing between the staggered row of sheaves 31 and driving them frictionally at a high rate of speed. Shaft 40 is provided on one end with a sprocket wheel 46 in chain connection with a driving sprocket wheel 47 mounted on the same shaft on which sprocket wheels 13 are secured. By varying the diameters of these various driving sprockets the speeds of the various mechanisms may be accurately and effectively controlled.

By means of the various adjusting mechanisms a portion of the ejector mechanisms may be placed out of commission, this being found desirable when the fruit being passed through the machine is approximately of the same size.

It will be observed from the foregoing description that the essential elements of this invention comprise a means of conveying the fruit through the apparatus and continuously rotating it during its passage therethrough, and a means for removing the different sizes of fruit at different points along the conveyer. It will also be noted that upon being delivered to the conveyer, the fruit will be delivered on one of its shorter diameters, as fruits which are not perfectly spherical tend to lie on one of those diameters, thus contributing to accuracy in sizing. By forming the conveyer mechanism of a plurality of spools, the fruit being conveyed thereby will be maintained in a completely separated condition, thus eliminating all danger of ejecting more than one fruit at a time by a single ejector mechanism, this being a very important point in the sizing of citrus fruit.

Having described my invention what I claim as new and desire to secure by Letters Patent is:—

1. In a fruit sizer, a horizontally moving carrier, comprised of a plurality of revoluble spools adapted to segregate the fruit and rotate the same, separating means arranged thereabove at graduated heights and spaced apart along said carrier, and means for operating said separating means.

2. In a fruit sizer, a horizontally moving carrier composed of a plurality of transversely disposed rotatable members, segregating the fruit and rotating the same, rotary separating means arranged thereabove at graduated heights, and means to rotate said separating means.

3. In a fruit sizer, a horizontally moving carrier composed of a plurality of revoluble spools separated from each other, segregating the fruit and rotating the same, rotary separating means arranged thereabove at graduated heights and spaced apart along said carrier, and means to operate the carrier and separating means in unison.

4. In a fruit sizer, a conveyer composed of a plurality of revoluble rolls, adapted to segregate the fruit and rotate the same, means to rotate said rolls when the conveyer is in operation, rotary separating means arranged thereabove at graduated heights and spaced apart along said conveyer, means to vertically adjust said separating means, and means to operate the conveyer and separating means simultaneously.

5. In a fruit sizer, a conveyer composed of a plurality of revoluble rolls, adapted to segregate the fruit and rotate the same, a support for said rolls, a plurality of rotatable disks arranged thereabove at graduated heights and spaced apart along said conveyer, means to adjust said disks, a friction drive for said disks, and means to operate the conveyer.

6. In a fruit sizer, the combination of a horizontally traveling carrier, said carrier composed of a plurality of revoluble rolls, said rolls being tapered in a longitudinal direction, a guard rail arranged alongside the traveling carrier at the smaller ends of the revoluble rolls, a plurality of revoluble separating means arranged thereabove at graduated heights and spaced apart along said carrier, means to vertically adjust said separating means, means to frictionally drive said separating means, and means to operate the conveyer.

7. In a fruit sizer, a horizontally moving carrier composed of a plurality of revoluble tapered rolls separated from each other, a support for said rolls, a separating means arranged thereabove at graduated heights and spaced apart along said carrier, and means to operate said separating means.

8. In a fruit sizer, a horizontally moving carrier composed of a plurality of revoluble tapered rolls separated from each other, means to rotate said rolls when the conveyer is in operation, a plurality of revoluble separating disks arranged thereabove at graduated heights and spaced apart along said carrier, said disks being provided on their under face with a flexible ejecting means, and means to rotate the disks and conveyer in unison.

9. In a fruit sizer, a horizontally moving carrier composed of a plurality of tapered rolls, a guard rail arranged above said carrier and at one side thereof, means to rotate the tapered rolls when the carrier is in operation, a plurality of revoluble separating disks arranged thereabove at graduated heights and spaced apart along said carrier, a flexible ejecting means on the under face of said disks, means to vertically adjust said disks, and means to operate the disks.

10. In a fruit sizer, a horizontally moving carrier composed of a plurality of tapered rolls and a carrier bed therefor, a guard rail arranged above said carrier and at one side thereof, a frame arranged above said carrier, a plurality of vertically disposed shafts mounted in said frame, a sheave for each shaft, means to adjust said shaft vertically, an ejector disk on the lower end of each shaft, said disks being provided on the under face thereof with bristles, means to frictionally drive said sheaves in unison, and means to operate said conveyer.

11. In a fruit sizer, a horizontally moving carrier composed of a plurality of tapered rolls and a carrier bed therefor, said rolls adapted to rotate on a movement of the carrier, a guard rail arranged above said carrier and at one side thereof, a plurality of revoluble ejector disks horizontally arranged thereabove at graduated heights and spaced apart along said carrier, said disks being tilted from the horizontal, and means to operate said ejector disks.

12. In a fruit sizer, a conveyer composed of a plurality of revoluble rolls and a conveyer bed therefor, a plurality of rotatable horizontally disposed disks arranged thereabove at graduated heights therefrom and spaced apart along said conveyer, said disks being slightly tilted from the horizontal, and means to rotate the conveyer and disks in unison.

13. An apparatus for sizing and grading fruit and the like, comprising feed means consisting of a plurality of transversely disposed relatively movable members adapted to segregate the fruit and rotate it, separating means arranged thereabove and comprising a plurality of members varyingly spaced therefrom; and means for operating said separating means.

14. Apparatus for sizing and grading fruit and the like, comprising feed means, separating means arranged thereabove and comprising a plurality of vertically disposed rotatable members varyingly spaced therefrom, the axis of rotation of each said rotatable members being in an inclined angular position with respect to the path of travel determined by the feed means, and means for operating said separating means.

15. An apparatus for sizing and grading fruit and the like, comprising feed means consisting of a plurality of relatively movable members, said members having their longitudinal axes transversely disposed with respect to their path of travel, separating means arranged thereabove and comprising a plurality of members varyingly spaced therefrom, and means for operating said separating means.

In witness that I claim the foregoing I have hereunto subscribed my name this 25th day of September, 1909.

C. C. McINTOSH.

Witnesses:
EDMUND A. STRAUSE,
ETHEL COLEMAN.